United States Patent [19]

Budny

[11] Patent Number: 4,681,660

[45] Date of Patent: Jul. 21, 1987

[54] METHOD AND DEVICE FOR RECLAIMING FLUID LUBRICANTS

[76] Inventor: Rick R. Budny, 2511 Stratford Dr., St. Joseph, Mich. 49085

[21] Appl. No.: 755,005

[22] Filed: Jul. 15, 1985

Related U.S. Application Data

[63] Continuation-in-part of Ser. No. 634,185, Jul. 26, 1984, abandoned, which is a continuation of Ser. No. 453,346, Dec. 27, 1982, abandoned.

[51] Int. Cl.$^4$ .............................................. C10G 33/06
[52] U.S. Cl. ...................................... 196/46.1; 196/98; 210/774; 210/805; 210/181; 210/196; 208/185; 208/186; 208/187; 208/359
[58] Field of Search ................ 196/46.1, 98; 210/181, 210/196, 774, 805; 208/185–187, 359

[56] References Cited

U.S. PATENT DOCUMENTS

| | | | |
|---|---|---|---|
| 1,926,188 | 9/1933 | Ankler | 208/186 |
| 1,936,033 | 11/1933 | Sarvent | 196/46.1 |
| 1,962,463 | 6/1934 | Renfrew | 196/46.1 |
| 2,116,344 | 5/1938 | Dunmire | 208/186 |
| 2,425,377 | 8/1947 | La Brecque | 196/46.1 |
| 2,451,668 | 10/1948 | Egger et al. | 208/359 |
| 2,702,268 | 2/1955 | Egger et al. | 208/359 |
| 3,726,063 | 4/1973 | Magorden et al. | 208/186 |
| 3,923,644 | 12/1975 | Hendman | 196/46.1 |
| 4,179,019 | 12/1979 | Danziger | 208/186 |
| 4,272,359 | 6/1981 | Owen | 196/46.1 |

Primary Examiner—David L. Lacey
Attorney, Agent, or Firm—Thomas J. Dodd

[57] ABSTRACT

A method and device for reclaiming fluid lubricants, such as oil, which removes both solid and liquid contaminants from the fluid through efficient, adjustable filters and vacuum distillation.

12 Claims, 3 Drawing Figures

METHOD AND DEVICE FOR RECLAIMING FLUID LUBRICANTS

CROSS REFERENCE TO RELATED APPLICATIONS

This application is a continuation-in-part of application Ser. No. 634,185, filed July 26, 1984, now abandoned which is a continuation of application Ser. No. 453,346, filed Dec. 27, 1982, now abandoned.

SUMMARY OF THE INVENTION

This invention relates to a device for reclaiming contaminated fluid lubricants, such as oil.

Reclamation, or recycling of lubricating oils is an important factor in today's industries. Dwindling supplies and rising costs have made replacement of industrial lubricating oils costly and may lead to equipment failure due to the manufacturer's delay in obtaining a suitable replacement lubricant in an effort to cut costs.

Present methods and devices for reclaiming oil utilize to some degree a combination filtration and distillation process to remove contaminants from the oil. Some of the biggest problems with current processes of this type include use of inefficient filters, leading to equipment breakdowns which result in increased downtime of the reclaiming device. Also present devices necessarily use high temperatures to facilitate distillation which is both energy inefficient and results in damaging chemical oxidation of the oil, thereby decreasing its useful life.

The present invention obviates the need for distillation at high temperatures and also provides for a variable flow rate of oil into a vacuum distillation chamber. Also, due to the high volume input flow and larger surface area available for filtration of solids, breakdowns and need for replacement of equipment is lessened.

Accordingly, it is an object of this invention to provide a novel device for reclaiming contaminated fluid lubricants such as oil.

Another object of this invention is to provide a device which is for reclaiming contaminated oil and which is highly energy efficient.

Another object of this invention is to provide a device for reclaiming contaminated oil that is economical to use.

Another object is to provide a device for reclaiming oil which is adaptable to reclaim many types of oils.

Another object is to provide a device for reclaiming oil which eliminates oxidation damage to the oil.

Another object is to provide an efficient method of reclaiming oil.

Other objects will become apparent upon a reading of the following description.

DESCRIPTION OF THE PREFERRED EMBODIMENTS

The preferred embodiments herein described are not intended to be exhaustive or to limit the invention to the precise forms disclosed. They are chosen and described to best explain the principles of the invention to enable others skilled in the art to utilize the invention.

Figure 1:
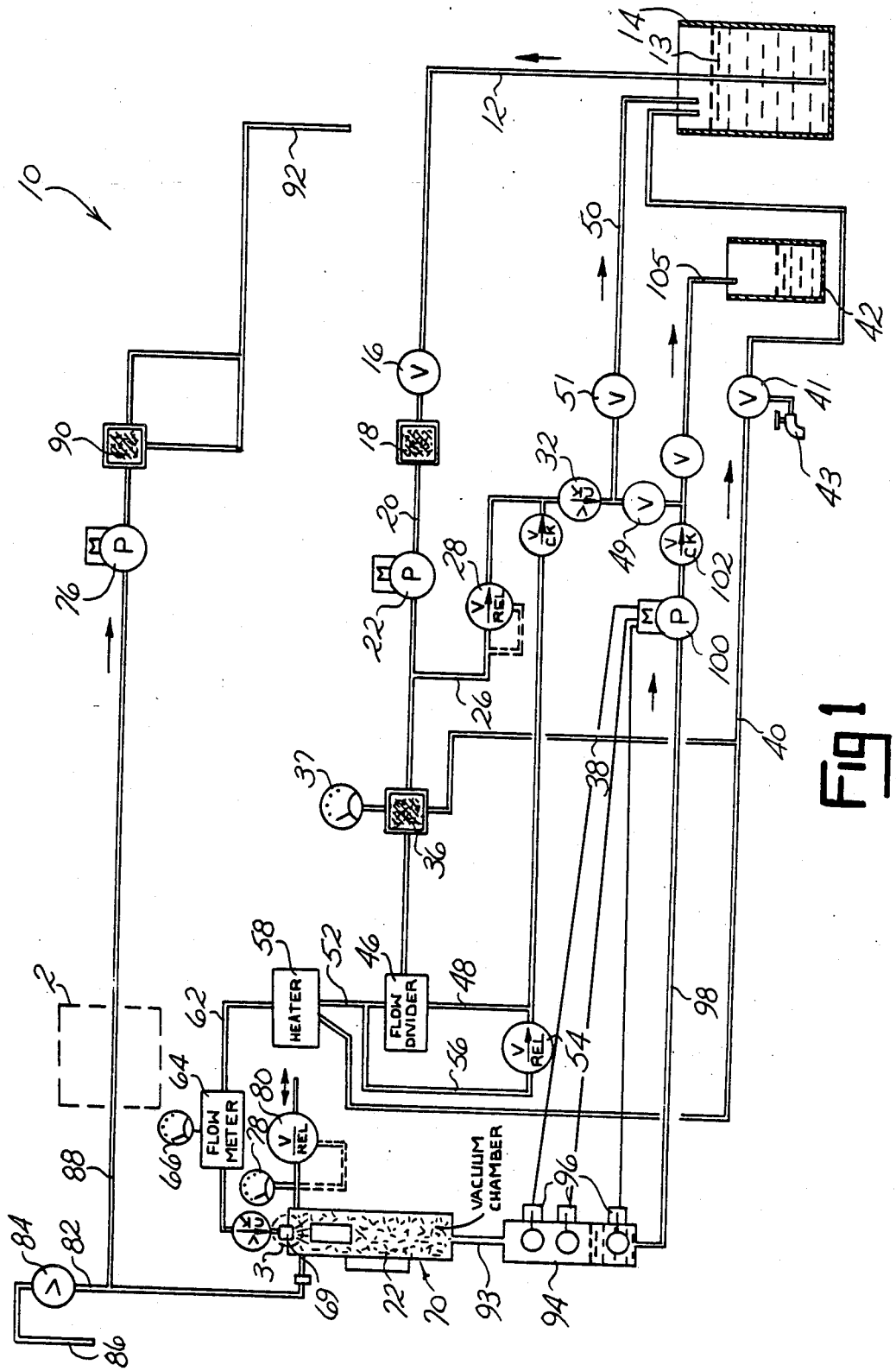
FIG. 1 is a diagram of the oil reclaiming device of this invention.

The oil reclaiming apparatus 10 of this invention is shown diagrammatically in FIG. 1 and includes an inlet 12 in liquid flow communication with a receptacle 14 which stores contaminated oil 13. Inlet 12 includes a manually operated valve 16 which regulates the amount of oil flow into apparatus 10.

After the fluid passes through valve 16, it enters a strainer 18 which is packed with wire mesh of a suitable grade to remove all large solid contaminants, such as rocks and similar particulate matter, from the oil. Upon exiting strainer 18, the oil passes into pipe 20 which is connected to a filter 36. Filter 36 may be of any standard variety industrial fluid filter which has an effective filtering surface area of at least 4,000 square inches. As the oil passes through filter 36, all remaining solid contaminants will be preferably removed from the oil. A flow gauge 37 is preferably located on filter 36 and serves to inform the machine operator of the flow rate of oil through the filter. Any fluid in excess of what filter 36 can accommodate during normal operation will exit the filter through drain pipe 38 and eventually leaves apparatus 10 through drain pipe 40 which is in flow communication with receptacle 14. A valve 41 and a spigot 43 are located on drain pipe 40. Should the operator wish to test the efficiency of filter 36, valve 41 and spigot 43 are opened and a sample of oil is withdrawn for testing purposes.

A pump 22 serves to draw contaminated oil 13 from receptacle 14 and control the flow rate of the oil though a part of apparatus 10.

A by-pass pipe 26, connected through a relief valve 28 and a check valve 32, is located in flow communication with tube 20 between pump 22 and filter 36 and extends to receptacle 14. When the fluid pressure in pipe 20 reaches a preset maximum value, such as can occur when filter 36 becomes clogged, valve 28 opens and the oil passes therethrough into receptacle 14.

The oil then passes from filter 36 into flow divider 46. As the fluid enters flow divider 46, a percentage is diverted into an outlet pipe 48 and thereafter into receptacle 14. Preferably about 75% of the fluid is diverted in this fashion, but this rate may be adjusted depending on the type of fluid being filtered with such percentage being usually in the range from 70-96%. Should the oil contain no liquid impurities, flow divider 46 is set to divert all of the fluid into outlet pipe 48. In this procedure, valve 51 is closed and valve 49 opened to allow the fluid to pass through connecting drain pipe 105 into storage receptacle 42 where the fluid is stored for further usage. A relief valve 54 is located in pipe 56 which extends between the outlet of divider 46 and pipe 48. Should the fluid pressure within connecting pipe 56 reach a preset maximum value, such as due to clogged fluid flow in the remainder of the system, valve 54 opens and allows fluid to pass through into outlet pipe 48 and eventually to receptacle 14 through drain 50.

The remaining fluid from flow divider 46 passes through pipe 52 into a heater 58. Heater 58 warms the fluid to a temperature of at least 60° C., and is adjustable to heat the oil as high as 83° C. depending upon the type of oil being reclaimed. The preferable temperature range will be very close to 60° C. since oils are subjected to damagingly high oxidation rates when heated above this temperature.

As the oil leaves heater 58 it passes by pipe 62 into a vacuum distillation chamber 70 through an atomizer 69 which is connected to pipe 62. Flow meter measures the rate of flow of the fluid which is read from a flow gauge 66. Atomizer 69 is preferably a spray nozzle having small (about 10 microns in diameter) outlet bores which atomize the oil mixture as it enters distillation chamber 70. Distillation chamber 70 is preferably a hollow container which is partially stuffed with a quantity of wire mesh 72. Chamber 70 is connected by pipe 88 to vacuum pump 76. Pump 76 serves to draw air out of chamber 70 and reduce its internal pressure. For example, at 60° C., water boils at a pressure of 27 inches of mercury, so when the oil mixture is heated to 60° C., by heater 58 to boil off the water within the oil, pump 76 is adjusted to maintain a pressure of no more than 27 inches of mercury in chamber 70. A gauge 78 measures the pressure inside chamber 70 and is connected to a vacuum relief valve 80 which operates as a safety check for the distillation chamber. As water contained in the oil boils inside chamber 70 the resulting steam is pulled out of the chamber by pump 76. A portion of the steam is pulled into a drain pipe 82, through a valve 84, and out of apparatus 10 through drain 86. The remaining portion of the steam is drawn into pipe 88 by vacuum pump 76, passed through a filter 90 to remove any residual oil, and exhausted from apparatus 10 through drain 92. Due to the relatively high density of oil, no oil is pulled out of chamber 70 by pump 76.

The distilled purified oil drains from chamber 70 through its wire mesh 72 and into float tank 94 through pipe 93. Float tank 94 is equipped with liquid level actuated switches 96. Outlet conduit 98 extends from tank 94 to a reservoir 42. A pump 100 is placed within outlet conduit 98. When the level of the oil inside tank 94 reaches a certain preset level, switches 96 activate pump 100. The cleaned oil is then drawn out of tank 94 and pumped through check valve 102 into reservoir 42 for furture use. An alternative construction of the apparatus would be to construct chamber 70 and float tank 94 as a single component.

Figures 2, 3:
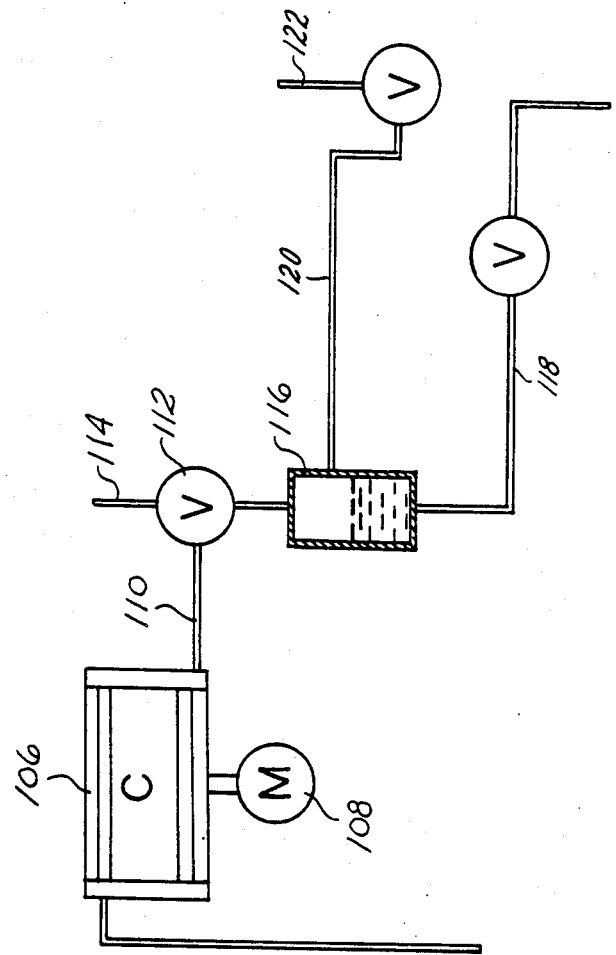
FIG. 2 is a diagram of an addition to the distillation apparatus shown as locatable within the broken line 2 of FIG. 1.
FIG. 3 is an enlarged detail view of the spray nozzle located within broken line 3 of FIG. 1.

An addition to apparatus 10 shown in FIG. 2 facilitates the condensation and removal of the steam produced in distillation chamber 70. According to this construction, as the steam passes into pipe 88, it is directed into a condensing unit 106. Condensing unit 106 may be of any standard construction and is powered by motor 108. The steam will condense into water inside unit 106 and be drawn by pump 76 through a conduit 110 into a shut-off valve 112 which, depending upon its chosen mode of operation, may direct the water out of apparatus 10 through a drain 114 or into a water storage tank 116 where the water is left to cool. When the volume of water inside tank 116 reaches a certain level, the water exits apparatus 10 through drain 118 and passes into a waste water receptacle, not shown. Any steam which may escape through unit 106 is drawn off into a pipe 120 and out of apparatus 10 at drain 122.

Constructed in this manner, apparatus 10 may be utilized to rapidly reclaim many different grades of oil due to its readily adjustable features, with minimal or no damage to the oil.

It is to be understood that the above description does not limit the invention to the precise form disclosed and that it may be modified within the scope of the appended claims.

I claim:

1. Apparatus for reclaiming fluid lubricants containing solid and liquid contaminants, said apparatus comprising inlet means for introducing a quantity of contaminated fluid into the apparatus, filtering means positioned adjacent to and in direct flow communication with said inlet means for removing said solid contaminants from said contaminated fluid, heater means serially connected and in flow communication with said filtering means for heating the fluid passed from said filtering means to the heater means to a temperature between 60° C. and 83° C., distillation means serially connected and in flow communication with said heater means for reducing the pressure of the fluid passage from said heater means to the distillation means to produce a purified fluid free of solid and liquid contaminants, and adjustable pump means in flow communication with said distillation means for regulating the pressure within the distillation means to correspond to the boiling point of the fluid passed from the heater means, an outlet conduit serially connected to and located in flow communication with said distillation means, said apparatus including a continuous conduit from said inlet means to said outlet conduit, pump means for propelling said fluid from said inlet means to said distillation means, and pump means in flow communication with said distillation means and said outlet conduit for directing said purified fluid from said distillation means through said outlet conduit, said apparatus further including flow dividing means for said heater means located between and in flow communication with said filtering means and said heater means so as to divert preselected percentage of said filtered fluid into said heater means, said apparatus further including a drain and a receptacle for containing the contaminated fluid, said drain being in flow communication between said flow dividing means and said receptacle, said flow dividing means positioned along said continuous conduit and in flow communiation with said drain so as to divert a remaining percentage of the filtered fluid passing through said flow dividing means to said drain, said drain being in flow communication with said receptacle so that said remaining percentage of filtered fluid may be recycled back into said apparatus.

2. Apparatus of claim 1 and further including means for regulating the rate of fluid flow through said filtering means and distillation means.

3. Apparatus of claim 1 wherein said fluid lubricant is oil and said distillation means includes means for reducing the pressure of the heated filtered fluid to a value correlated to the temperature of the filtered fluid produced by said heater means wherein water will be boiled out of the heated filtered fluid.

4. Apparatus of claim 1 and further including means in flow communication with said distillation means for removing the liquid contaminants from said apparatus after the liquid contaminants have been boiled out of the fluid.

5. Apparatus of claim 4 wherein said means for removing the boiled liquid contaminants include pipe means for carrying liquid located in flow communication with said distillation means, a condensor in flow communication with said pipe means, means for drawing the boiled liquid contaminants through said pipe means through said condensor where the boiled liquid contaminants therein condense to form water, and a filter means in flow communication with said condensor for removing residual oil from the water passed from said condensor.

6. Apparatus of claim 1 wherein said distillation means includes an inlet and outlet, a nozzle defining said inlet in flow communication with said distillation means, said nozzle includes means for atomizing the fluid prior to introduction of the fluid into said distillation means.

7. Apparatus of claim 1 wherein said distillation means includes a vacuum distillation chamber, and further including a float chamber serially connected to and in flow communication with said vacuum distillation chamber so as to receive the purified fluid and including switch means for activating said propelling pump means when the level of the purified fluid within the float chamber reaches a predetermined level.

8. A method of reclaiming fluid lubricants containing solid and liquid contaminants comprising the steps of:
(a) passing said fluid lubricants from a receptacle through an inlet to a filter medium to remove said solid contaminants; then
(b) diverting a preselected portion of said fluid lubricants into a heater, with the remaining portion of said fluid lubricants being diverted back to said receptacle; then
(c) heating said preselected portion of said lubricants to a temperature of at least 60° C.; then
(d) passing said preselected portion of fluid lubricants into a closed chamber at reduced pressures wherein said liquid contaminants boil; then
(e) removing said boiled liquid contaminants from said preselected portion of fluid lubricants by vacuum separation of the boiled liquid contaminants from the fluid lubricants.

9. The method of claim 8 wherein step (c) includes heating said fluid lubricants to a temperature ranging from 60° C. to 83° C.

10. Method of claim 9 wherein step d) includes adjusting said pressure in said closed chamber relative to the temperature of said fluid lubricants.

11. The method of claim 9 wherein step d) includes pumping said boiled liquid contaminants out of said chamber into a condensation mechanism wherein the boiled liquid contaminants condense.

12. Method of claim 8 wherein step (d) includes atomizing said fluid lubricants after heating and prior to passing the fluid lubricants into said closed chamber.

* * * * *